(12) United States Patent
Veeramani et al.

(10) Patent No.: US 10,897,491 B2
(45) Date of Patent: Jan. 19, 2021

(54) CONTENT PROVISION BASED ON USAGE ANALYTICS FOR MULTIPLE DISPLAY RECEIVER DEVICES

(71) Applicant: Intel Corporation, Santa Clara, CA (US)

(72) Inventors: Karthik Veeramani, Hillsboro, OR (US); Rajesh Poornachandran, Portland, OR (US); Rajneesh Chowdhury, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 15/856,749

(22) Filed: Dec. 28, 2017

(65) Prior Publication Data

US 2019/0044989 A1    Feb. 7, 2019

(51) Int. Cl.
*H04L 29/06* (2006.01)
*H04L 29/08* (2006.01)
*H04N 21/442* (2011.01)
*H04N 21/658* (2011.01)
*H04N 21/2668* (2011.01)
(Continued)

(52) U.S. Cl.
CPC ........... *H04L 65/602* (2013.01); *G06F 21/71* (2013.01); *H04L 65/4069* (2013.01); *H04L 65/4076* (2013.01); *H04L 67/22* (2013.01); *H04L 67/36* (2013.01); *H04L 67/42* (2013.01); *H04N 21/25816* (2013.01); *H04N 21/2668* (2013.01); *H04N 21/41407* (2013.01); *H04N 21/44204* (2013.01); *H04N 21/44218* (2013.01); *H04N 21/4667* (2013.01); *H04N 21/6582* (2013.01);
(Continued)

(58) Field of Classification Search
None
See application file for complete search history.

(56) References Cited

U.S. PATENT DOCUMENTS 9,230,212 B2 * 1/2016 Su .............................. G06N 5/04
2007/0030393 A1 * 2/2007 Lee .......................... G09G 5/14
348/565

(Continued)

OTHER PUBLICATIONS

Rajneesh Chowdhury et al., "Provision of Secure Content to a Display Receiver Device Without Transcription", U.S. Appl. No. 15/640,025, filed Jun. 30, 2017, 53 pages.

*Primary Examiner* — Nicholas R Taylor
*Assistant Examiner* — Tania M Pena-Santana
(74) *Attorney, Agent, or Firm* — Schwabe, Williamson & Wyatt, P.C.

(57) ABSTRACT

Embodiments include apparatuses, methods, and systems including a display transmitter device, one or more display receiver devices, and a content server. A plurality of display contents may be delivered from a content server to a corresponding plurality of display receiver devices via a display transmitter device. A plurality of usage analytics information of the plurality of display contents of the plurality of display receiver devices may be received by the content server, along with corresponding identification information of the plurality of display receiver devices. The plurality of display contents may be selectively adjusted by the content server based on the plurality of usage analytics information of the plurality of display contents of the plurality of display receiver devices. Other embodiments may also be described and claimed.

25 Claims, 11 Drawing Sheets

(51) Int. Cl.
  *H04N 21/466*  (2011.01)
  *H04N 21/258*  (2011.01)
  *H04N 21/414*  (2011.01)
  *G06F 21/71*  (2013.01)

(52) U.S. Cl.
  CPC .... *G06F 2221/2149* (2013.01); *H04L 67/125* (2013.01); *H04L 2463/101* (2013.01)

(56) References Cited

U.S. PATENT DOCUMENTS

| | | | |
|---|---|---|---|
| 2007/0169149 A1* | 7/2007 | Jennings | H04N 7/165 725/58 |
| 2008/0109888 A1* | 5/2008 | Ullah | G06F 21/10 726/7 |
| 2012/0240144 A1* | 9/2012 | Rose | H04N 21/4756 725/14 |
| 2013/0080194 A1* | 3/2013 | Im | H04L 67/306 705/5 |
| 2013/0238702 A1* | 9/2013 | Sheth | H04L 67/38 709/204 |
| 2014/0047072 A1* | 2/2014 | Shuster | H04N 21/25841 709/219 |
| 2014/0365611 A1* | 12/2014 | Praveenkumar | H04W 8/005 709/219 |
| 2015/0066583 A1* | 3/2015 | Liu | G06Q 30/0255 705/7.29 |
| 2016/0261905 A1* | 9/2016 | Aruga | G06K 7/10366 |
| 2016/0337689 A1* | 11/2016 | Yoshimura | H04W 76/14 |

* cited by examiner

CONTENT PROVISION BASED ON USAGE ANALYTICS FOR MULTIPLE DISPLAY RECEIVER DEVICES

FIELD

Embodiments of the present invention relate generally to the technical fields of digital content distribution and display, and more particularly to display systems with multiple display receiver devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A display system may include a display transmitter device and multiple display receiver devices, where the display transmitter device may provide/relay display contents, e.g., multimedia display contents such as music, movies, photos, videos, and applications, of a digital content distributor/provider to the multiple display receiver devices. Each display receiver device of the multiple display receiver devices may receive a different display content of the digital content distributor/provider, from the display transmitter device. A display system including a display transmitter device and multiple display receiver devices may be a wireless display system. Sometimes, such a display system may be a wired system where the multiple display receiver devices may be connected to the display transmitter device by wires.

Usage analytics information associated with a display content, e.g., playback count, real time streaming, may be of great value to the content distributor/provider for many reasons. For example, based on usage analytics information, the content distributor/provider may deliver more appropriate or personalized display content for each display receiver device, leading to improved user experience and in turn, potentially increased number of subscribers for contents of the content distributor/provider. However, current techniques for delivering a display content based on usage analytics information associated with the display content may be limited to cases when there is a direct one-to-one relationship between a digital content distributor/provider and a display receiver device. Current techniques for delivering display contents based on usage analytics information do not work when multiple display contents are played on multiple display receiver devices through one display transmitter device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
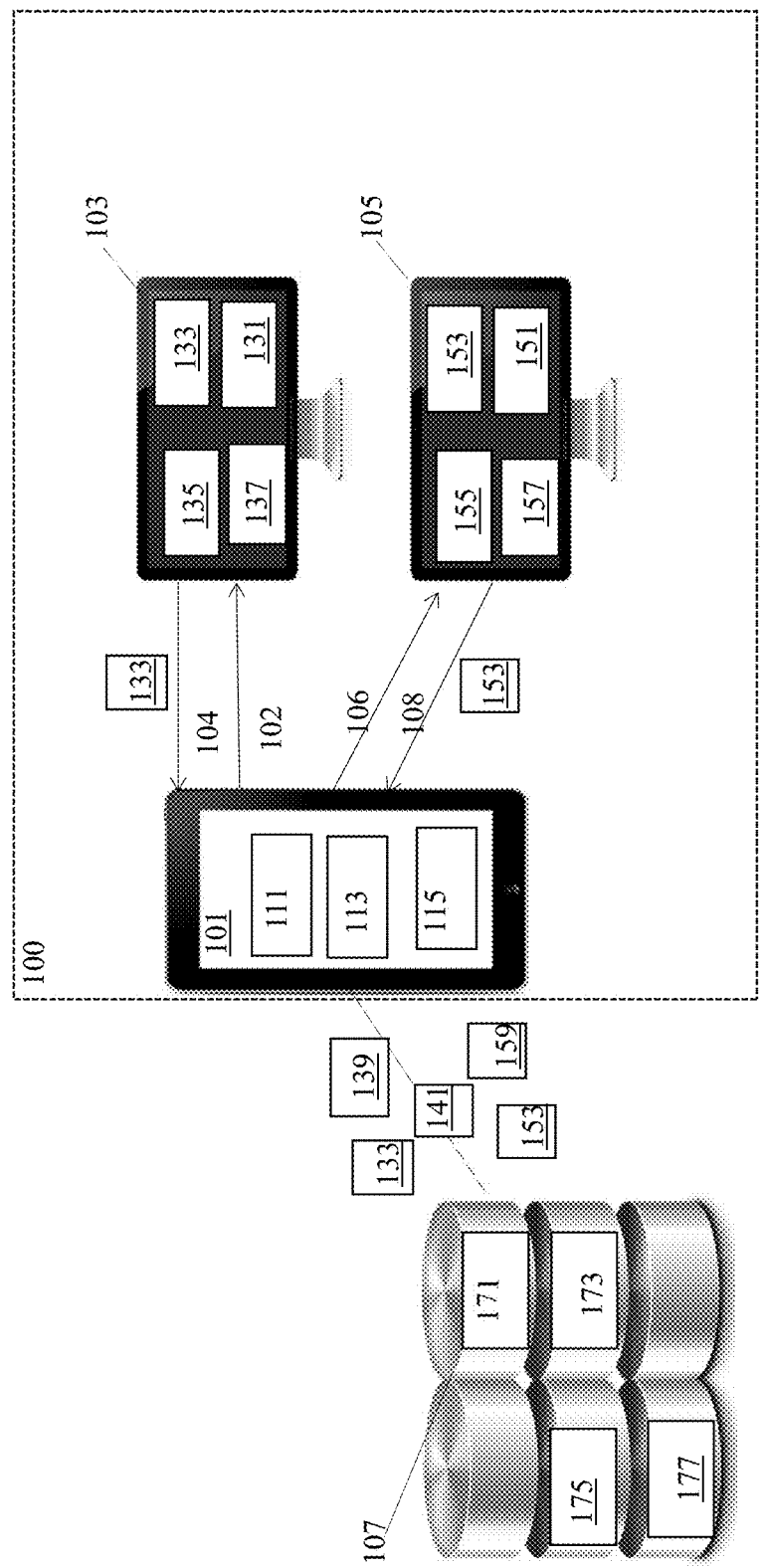
FIG. 1 illustrates an example display system including a display transmitter device and multiple display receiver devices to receive display contents from a content server, and the content server to adjust respective display contents based on corresponding usage analytics information from the multiple display receiver devices, in accordance with various embodiments.

A display system may include a display transmitter device to communicate with multiple display receiver devices. Display contents may be provided by a content server through the display transmitter device to the multiple display receiver devices. Respective usage analytics information may be associated with the display contents played on the various display receiver devices. Current techniques for delivering display contents based on usage analytics information respectively associated with the display contents may not work in respectively adjusting the display contents based on the corresponding usage analytics information from the various multiple display receiver devices communicating with the content server through the display transmitter device.

For a content server, the display contents to the multiple display receiver devices may all be delivered through one display transmitter device. Hence, from the content server's perspective, the display contents may be associated with the display transmitter device, and the content server may not be able to distinguish the multiple display receiver devices. Accordingly, the content server may not be able to distinguish different usage analytics information from the multiple display receiver devices, and respectively adjust the display contents based on the corresponding multiple usage analytics information. In embodiments, usage analytics information from a display receiver device of the multiple display receiver devices may be associated with an identification information of the display receiver device. The display transmitter device may transmit the usage analytics information of the display receiver device, including the identification information of the associated display receiver device, to the content server. Therefore, the content server may be able to properly associate the usage analytic information with the corresponding display receiver device, and adjust the display content to the particular display receiver device based on the corresponding usage analytics information, identified by the identification information of the particular display receiver device.

In embodiments, a display transmitter device for provision of display content may include a communication interface and a usage analytics engine coupled to the communication interface. The communication interface may receive from a display receiver device of the multiple display receiver services the display transmitter device services, via a backchannel of a display protocol between the display transmitter device and the particular display receiver device, usage analytics information associated with the display content being displayed at the display receiver device. The display content may be from a content server and relayed to the display receiver device, by the display transmitter device. via a forward channel of the display protocol. The usage analytics engine may transmit the usage analytics information of the display receiver device, including the identification information of the display receiver device, and other parameters to the content server.

In embodiments, a display receiver device for provision of display content may include a communication interface, and a usage analytics engine coupled to the communication interface. The communication interface may receive a display content from a content server through a display transmitter device, via a forward channel of a display protocol between the display transmitter device and the display receiver device. The display receiver device may be one of a plurality of display receiver devices to communicate and receive display contents from the display transmitter device via the display protocol. The usage analytics engine may collect usage analytics information related to the display content being displayed at the display receiver device. The communication interface may further transmit the usage analytics information to the content server through the display transmitter device via a back channel of the display protocol. An identification information of the display receiver device may be transmitted along to identify the usage analytics information as being associated with the display receiver device, and distinguishes the usage analytic information of the display receiver device from usage analytic information of other ones of the plurality of display receiver devices.

In embodiments, a content server for provision of display content may include a communication interface and a presentation engine coupled to the communication interface. The communication interface may deliver a plurality of display contents to a corresponding plurality of display receiver devices via a display transmitter device. The communication interface may also receive, from the display transmitter device a plurality of usage analytics information of the plurality of display contents of the plurality of display receiver devices along with corresponding identification information of the plurality of display receiver devices. The presentation engine may selectively adjust respective ones of the plurality of display contents based on corresponding ones of the plurality of usage analytics information of the plurality of display contents of the plurality of display receiver devices.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

Some embodiments may be used in conjunction with various devices and systems, for example, a communication system, a communication device, a wireless communication system, a wireless communication device, a wired communication device, a wired communication system, a personal computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wired or wireless modem, a video device, an audio device, an audio-video (AN) device, a wired or wireless network, a wireless area network, a wireless video area network (WVAN), a local area network (LAN), a wireless LAN (WLAN), a personal area network (PAN), a wireless PAN (WPAN), a wireless wide area network (WWAN), and the like.

Some embodiments may be used in conjunction with devices and/or networks operating in accordance with existing web real-time communication standards, IEEE 802.11 standards, wireless-gigabit-alliance (WGA) specifications, wireless fidelity (WiFi) alliance (WFA) peer-to-peer (P2P) specifications, 3rd generation partnership project (3GPP), 3GPP long term evolution (LTE), any current and/or future versions and/or derivatives thereof, and the like.

Some embodiments may be used in conjunction with one way and/or two-way radio communication systems, cellular radio-telephone communication systems, a mobile phone, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation, discrete multi-tone (DMT), Bluetooth®, global positioning system (GPS), Wi-Fi, Wi-Max, ZigBee™, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other wired and/or wireless devices, systems and/or networks.

The term "wireless device," as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

The term "communication device", as used herein, includes, for example, a device capable of wireless and/or wired communication, a communication device capable of wireless and/or wired communication, a communication station capable of wireless and/or wired communication, a portable or non-portable device capable of wireless and/or wired communication, or the like. In some embodiments, a communication device may be or may include a peripheral that is integrated with a computer, or a peripheral that is attached to a computer.

FIG. 1 illustrates an example display system 100 including a display transmitter device 101 and multiple display receiver devices, e.g., a display receiver device 103, and a display receiver device 105, to receive display contents from a content server 107, and the content server 107 to adjust respective display contents based on corresponding usage analytics information from the multiple display receiver devices, in accordance with various embodiments. For clarity, features of the display system 100 including the display transmitter device 101, the display receiver device 103, and the display receiver device 105, and the content server 107, may be described below as an example for understanding an example display system including a display transmitter device and multiple display receiver devices to receive display contents from a content server, and the content server to adjust respective display contents based on corresponding usage analytics information from the multiple display receiver devices. It is to be understood that there may be more or fewer components included in the display system 100 including the display transmitter device 101, the display receiver device 103, and the display receiver device 105, and the content server 107. Further, it is to be understood that one or more of the devices and components within the display system 100 including the display transmitter device 101, the display receiver device 103, and the display receiver device 105, and the content server 107 may include additional and/or varying features from the description below, and may include any devices and components that one having ordinary skill in the art would consider and/or refer to as the devices and components of a display system including a display transmitter device and multiple display receiver devices to receive display contents from a content server, and the content server to adjust display contents based on usage analytics information from the multiple display receiver devices.

In embodiments, the display system 100 may include the display transmitter device 101 and multiple display receiver devices, e.g., the display receiver device 103, and the display receiver device 105, to receive respective display contents from the content server 107. The display receiver device 103 may include a display content 131, a usage analytics information 133, a communication interface 135, and a usage analytics engine 137. The display receiver device 105 may include a display content 151, a usage analytics information 153, a communication interface 155, and a usage analytics engine 157. The display transmitter device 101 may include a communication interface 111, a usage analytics engine 113, and a storage 115. The content server 107 may include a communication interface 171, a presentation engine 173, a display content 175, and a display content 177.

In embodiments, the display system 100 may include one or more display transmitter devices, each communicating with a plurality of display receiver devices. The display transmitter device 101 may be one such exemplary display transmitter device. Similarly, the display receiver device 103 and the display receiver device 105 may be two of such exemplary display receiver devices. There may be other additional components, such as a router to facilitate the communication between the one or more display transmitter devices and one or more display receiver devices, not shown.

In embodiments, for the display receiver device 103, the communication interface 135 may receive the display content 175 from the content server 107 through the display transmitter device 101, via a forward channel 102 of a display protocol between the display transmitter device 101 and the display receiver device 103. The received display content may become the display content 131. The usage analytics engine 137 may be coupled to the communication interface 135 to collect the usage analytics information 133 related to the display content 131. The communication interface 135 may transmit the usage analytics information 133 to the content server 107 through the display transmitter device 101 via a back channel 104 of the display protocol between the display transmitter device 101 and the display receiver device 103. In some embodiments, an identification information of the display receiver device 103 may be transmitted along with the usage analytics information 133, where the identification information identifies the usage analytics information 133 as being associated with the display receiver device 103. Hence, the usage analytics information 133 may be distinguished from usage analytic information of other ones of the plurality of display receiver devices. The content server 107 may adjust the display content 175 based on the usage analytics information 133 to obtain an adjusted display content, which may be delivered to the display receiver device 103. The communication interface 135 may further receive the adjusted display content from the content server 107 through the display transmitter device 101.

Similarly, in embodiments, for the display receiver device 105, the communication interface 155 may receive the display content 177 from the content server 107 through the display transmitter device 101, via a forward channel 106 of the display protocol between the display transmitter device 101 and the display receiver device 105. The received display content may become the display content 151. The usage analytics engine 157 may be coupled to the communication interface 155 to collect the usage analytics information 153 related to the display content 151. The communication interface 155 may transmit the usage analytics information 153 to the content server 107 through the display transmitter device 101 via a back channel 108 of the display protocol. In some embodiments, an identification information of the display receiver device 105 may be transmitted along with the usage analytics information 153, where the identification information is to identify the usage analytics information 153 as being associated with the display receiver device 105. Hence, the usage analytics information 153 may be distinguished from usage analytic information of other ones of the plurality of display receiver devices. The content server 107 may adjust the display content 177 based on the usage analytics information 153 to obtain an adjusted display content, which may be delivered to the display receiver device 105. The communication interface 155 may further receive the adjusted display content from the content server 107 through the display transmitter device 101.

In embodiments, the display content 175, the display content 131, the display content 177, or the display content 151, may be a multimedia content, which may be a content that may include a combination of different content forms such as text, audio, music, movies, photos, applications, graphics, images, animations, still images, video and interactive content. The display content 175, the display content 131, the display content 177, or the display content 151 may be recorded, played, displayed, and interacted with or accessed by the display receiver device 103 or the display receiver device 105, which may be an information content processing device, such as computerized and electronic devices. In some embodiments, the display receiver device 103 or the display receiver device 105 may be a selected one of a smart phone, a tablet, a wireless display, a smart television (TV), a touchscreen display, or a head-mounted display (HMD). In embodiments, the display receiver device 103 or the display receiver device 105 may include a display, which may be a selected one of a light-emitting diode (LED) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

In embodiments, the usage analytics information 133 may include information about the display content 131 related to a playback count, a real time streaming duration, a number of offline views, a content key rotation, a content metering, a location of the display content 131 where a pause operation is performed, or a section of the display content 131 that has been rewound, repeated, or zoomed in. The usage analytics information 133 may be a user analytics for a user of the display receiver device 103, a device analytics for the display receiver device 103, or a content analytics related to the display content 131. The usage analytics information 153 may be similar to the usage analytics information 133.

In some embodiments, when the display receiver device 103 may be a HMD in a virtual reality (VR) system, an augmented reality and merged reality system, the usage analytics information 133 may include head tracking or eye tracking data associated with a part of the display content 131. For example, when the display system 100 may be a 360 video of a basketball game, the display receiver device 103 may be a HMD for a user. The display receiver device 103 may be used to track the user's favorite player throughout the basketball game, where the tracking data may be a part of the analytics information 133. If the content server 107 encodes data such as each player's location in the 360 space for each frame, using the head position data included in the analytics information 133, the content server 107 may determine that the view of the user was centered mostly on a specific player. Hence, the content server 107 may serve more meaningful secondary contents (such as, program metadata, player statistics/bibliography, commercials, and so forth) to the display receiver device 103 so that the user of the display receiver device 103 may view more information about the favorite player (e.g., t-shirts with the player's image printed on them).

In embodiments, the forward channel 102, and the back channel 104 may be based on a display protocol, which may include some communication or computing protocols. The display protocol for the forward channel 102 and the back channel 104 may include a protocol stack containing protocols in various layers, e.g., protocols for a physical layer, a medium access layer, a network layer, and/or an application layer. For example, the display protocol for the forward channel 102 and the back channel 104 may be a wireless display protocol designed for communication between the display transmitter device 101 and the display receiver device 103. In embodiments, the wireless display protocol may be a selected one of a mobile industry processor interface display serial interface (MIPI-DSI) protocol, a Miracast protocol, or a wireless display (WiDi) protocol. In some embodiments, when wired cables are used as some of the forward channel 102 and the back channel 104, other wired display protocol, e.g., a high-definition multimedia interface (HDMI) protocol, or a display port (DP) protocol, may be used as well. For example, the display protocol may be a Miracast protocol and the back channel 104 may be a user input back channel (UIBC) of the Miracast protocol. Additionally and alternatively, the display protocol may be a HDMI protocol, and the back channel 104 may be a consumer electronics control (CEC) channel for the HDMI protocol. In embodiments, the forward channel 106, and the back channel 108 may be similar to the forward channel 102, and the back channel 104.

In embodiments, the display transmitter device 101 may include the communication interface 111, the usage analytics engine 113 coupled to the communication interface 111, and the storage 115 coupled to the communication interface 111 and the usage analytics engine 113. The display transmitter device 101 may be a wearable device, a smartphone, a computer tablet, a laptop, a game controller, a set-top box, an infotainment console, an Internet of Things (IoT) device, or others. The display transmitter device 101 may communicate with the display receiver device 103 or the display receiver device 105 using a client-server model of computing, where the display transmitter device 101 may be a server. In some other embodiments, the display transmitter device 101 and the display receiver device 103 or the display receiver device 105 may communicate using peer-to-peer model, when the display transmitter device 101 and the display receiver device 103 or the display receiver device 105 may share and consume resources in an equipotent manner. In embodiments, the display transmitter device 101 may be a master device communicating with the display receiver device 103 or the display receiver device 105, where the display receiver device 103 or the display receiver device 105 may be a slave device.

The communication interface 111 may receive the display content 175 from the content server 107, and further relay the display content 175, via the forward channel 102, to the display receiver device 103. The received display content by the display receiver device 103 may become the display content 131. The communication interface 111 may receive from the display receiver device 103, via the backchannel 104, the usage analytics information 133 associated with the display content 131. Similarly, the communication interface 111 may receive the display content 177 from the content server 107, and further relay the display content 177, via the forward channel 106, to the display receiver device 105. The received display content by the display receiver device 105 may become the display content 151. The communication interface 111 may receive from the display receiver device 105, via the backchannel 108, the usage analytics information 153 associated with the display content 151.

The usage analytics engine 113 may transmit the usage analytics information 133 of the display receiver device 103, including an identification information 139 of the display receiver device 103, to the content server 107. In addition, the usage analytics engine 113 may transmit the usage analytics information 153 of the display receiver device 105, including an identification information 159 of the display receiver device 105, to the content server 107. Furthermore, the usage analytics engine 113 may aggregate the usage analytics information 133 and the usage analytics information 153 to generate a collective usage analytics information 141 to be transmitted to the content server 107.

In embodiments, the identification information 139 of the display receiver device 103 may identify the display receiver device 103 from a plurality of other display receiver devices, e.g., the display receiver device 103, and the display receiver device 105. The identification information 159 of the display receiver device 105 may identify the display receiver device 105 from a plurality of other display receiver devices, e.g., the display receiver device 103, and the display receiver device 103. In addition, the identification information 139 and the identification information 159 may further identify a user, a content, or a location for the display receiver devices. In some embodiments, the identification information 139 of the display receiver device 103 may be sent from the display receiver device 103. In some other embodiments, the identification information 139 of the display receiver device 103 may be stored in the storage 115. The display receiver device 103 may send the usage analytics information 133 to the communication interface 111, and the usage analytics engine 113 may match the usage analytics information 133 to the identification information 139 of the display receiver device 103, and send the usage analytics information 133 along with the identification information 139 to the content server 107. Similar operations may be available for the identification information 159 of the display receiver device 105.

The content server 107 may adjust the display content 175 based on the usage analytics information 133 to obtain an adjusted display content to be delivered to the display receiver device 103. The content server 107 may adjust the display content 177 based on the usage analytics information 153 to obtain an adjusted display content to be delivered to the display receiver device 105. The communication interface 111 may receive the adjusted display content based on the display content 175 from the content server 107, and further transmit the adjusted display content to the display receiver device 103. The communication interface 111 may receive the adjusted display content based on the display content 177 from the content server 107, and further transmit the adjusted display content to the display receiver device 105.

In embodiments, the content server 107 may include the communication interface 171 to deliver a plurality of display contents to a corresponding plurality of display receiver devices via a display transmitter device. For example, the communication interface 171 may deliver the display content 175 to the display receiver device 103 via the display transmitter device 101, where the received display content may become the display content 131 in the display receiver device 103. The communication interface 171 may deliver the display content 177 to the display receiver device 105 via the display transmitter device 101, where the received display content may become the display content 151 in the display receiver device 105.

In embodiments, the communication interface 171 may receive, from the display transmitter device 101 a plurality of usage analytics information of the plurality of display contents of the plurality of display receiver devices along with corresponding identification information of the plurality of display receiver devices. For example, the communication interface 171 may receive, from the display transmitter device 101, the usage analytics information 133 of the display content 131 of the display receiver device 103 along with corresponding identification information 139 of the display receiver device 103. The communication interface 171 may receive, from the display transmitter device 101, the usage analytics information 153 of the display content 151 of the display receiver device 105 along with corresponding identification information 159 of the display receiver device 105. The communication interface 171 may also receive the collective usage analytics information 141 aggregated by the display transmitter device 101 based on the usage analytics information 133 and the usage analytics information 153.

The presentation engine 173 may be coupled to the communication interface 171 to selectively adjust respective ones of the plurality of display contents based on corresponding ones of the plurality of usage analytics information of the plurality of display contents of the plurality of display receiver devices. For example, the presentation engine 173 may selectively adjust the display content 175 based on the usage analytics information 133 of the display content 131 of the display receiver device 103, and adjust the display content 177 based on the usage analytics information 153 of the display content 151 of the display receiver device 105. Afterwards, the communication interface 171 may further deliver through the display transmitter device 101 the selectively adjusted respective ones of display contents to corresponding ones of the plurality of display receiver devices along with the corresponding identification information of the plurality of display receiver devices. For example, the communication interface 171 may further deliver through the display transmitter device 101, the adjusted display content based on the display content 175 and the usage analytics information 133 to the display receiver device 103 along with the corresponding identification information 139 of the display receiver device 103, and the adjusted display content based on the display content 177 and the usage analytics information 153 to the display receiver device 105 along with the corresponding identification information 159 of the display receiver device 105.

Figure 2:
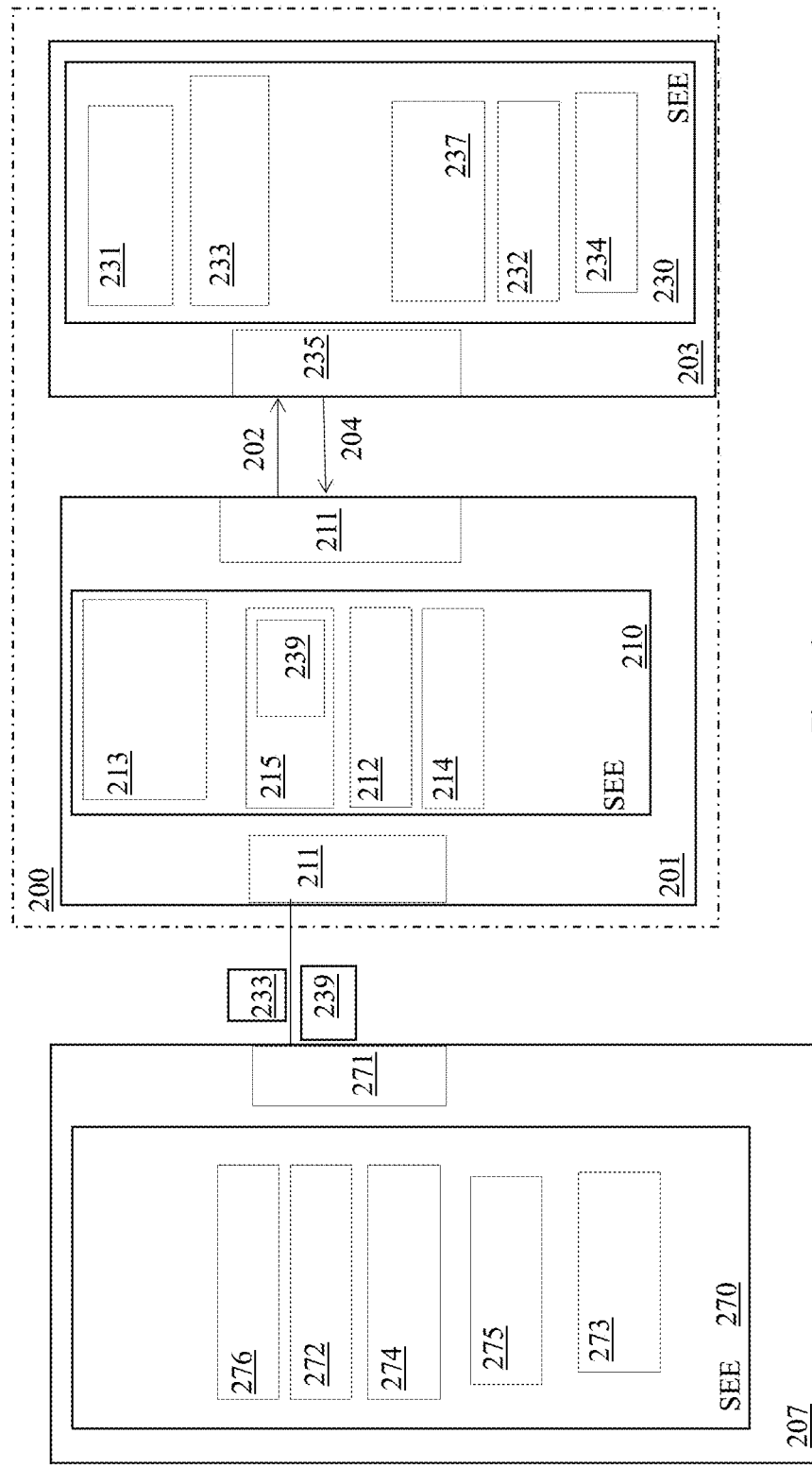
FIG. 2 illustrates another example display system including a display transmitter device and a display receiver device to receive display contents from a content server, and the content server to adjust respective display contents based on corresponding usage analytics information from the display receiver device, in accordance with various embodiments.

FIG. 2 illustrates another example display system 200 including a display transmitter device 201 and a display receiver device 203 to receive display contents from a content server 207, and the content server 207 to adjust respective display contents based on corresponding usage analytics information from the display receiver device 203, in accordance with various embodiments. There may be multiple display receiver devices, not shown, to communicate with the display transmitter device 201. The display system 200 and the content server 207 may be an example of the display system 100 and the content server 107 shown in FIG. 1.

In embodiments, the display system 200 may include the display transmitter device 201 and the display receiver device 203 to receive display contents from the content server 207. The display receiver device 203 may include a communication interface 235 and a secure execution environment 230. The secure execution environment 230 may include a display content 231, a usage analytics information 233, a usage analytics engine 237, a secure timer 232, and an authentication unit 234. The display transmitter device 201 may include a communication interface 211 and a secure execution environment 210. The secure execution environment 210 may include a usage analytics engine 213, a storage 215, a secure timer 212, and an authentication unit 214. An identification information 239 of the display receiver device 203 may be stored in the storage 215. The content server 207 may include a communication interface 271, and a secure execution environment 270. The secure execution environment 270 may include a presentation engine 273, a display content 275, a secure timer 272, a policy management unit 274, and a license server 276.

In embodiments, the display content 275 in the content server 207 may be a premium content or a secure content managed by the policy management unit 274 subject to a digital right management (DRM) policy. The license server 276 may grant the display receiver device 203 access to the display content 275 when certain security conditions are met by the display receiver device 203. The access granted to the display receiver device 203 may have a limited time interval, which may be managed by the secure timer 272.

In embodiments, the display transmitter device 201 may include the secure execution environment 210, and the display receiver device 203 may include the secure execution environment 230 to provide secure access to the display content 275, which may be a premium content or a secure content managed by the policy management unit 274 in the content server 207. The usage analytics engine 213 within the secure execution environment 210 may operate the authentication unit 214 to authenticate the display receiver device 203 before the communication interface 235 of the display receiver device 203 is to receive the display content 275 from the content server 207 through the display transmitter device 201. Similarly, the usage analytics engine 237 within the secure execution environment 230 may operate the authentication unit 234 to authenticate the display receiver device 203 to the display transmitter device 201 before the communication interface 235 of the display receiver device 203 is to receive the display content 275 from the content server 207.

In embodiments, after the display receiver device 203 has been authenticated, the communication interface 235 may receive the display content 275 from the content server 207 through the display transmitter device 201, via a forward channel 202 of a display protocol between the display transmitter device 201 and the display receiver device 203. In some embodiments, the display content 275 from the content server 207 may pass through the display transmitter device 201 to the display receiver device 203 without transcription by the display transmitter device 201. The received display content may become the display content 231.

In embodiments, the usage analytics engine 237 may be coupled to the communication interface 235 to collect the usage analytics information 233 related to the display content 231. The communication interface 235 may transmit the usage analytics information 233 to the content server 207 through the display transmitter device 201 via a back channel 204 of the display protocol. In some embodiments, an identification information, e.g., the identification information 239, of the display receiver device 203 may be transmitted along with the usage analytics information 233, where the identification information is to identify the usage analytics information 233 as being associated with the display receiver device 203. Hence, the usage analytics information 233 may be distinguished from usage analytic information of other ones of the plurality of display receiver devices. In embodiments, the identification information of the display receiver device 203 may be valid within a time interval. The secure timer 232 may control the time interval during which the identification information of the display receiver device 203 may be valid. In some other embodiments, the communication interface 235 may only transmit the usage analytics information 233 to the display transmitter device 201, and the display transmitter device 201 may associate the usage analytics information 233 with the identification information 239 to be transmitted together to the content server 207.

The content server 207 may adjust the display content 275 by the presentation engine 273 based on the usage analytics information 233 to obtain an adjusted display content. The adjusted display content may be delivered along with the identification information 239 to the display receiver device 203. The communication interface 235 of the display receiver device 203 may further receive the adjusted display content from the content server 207 through the display transmitter device 201.

Figure 3:
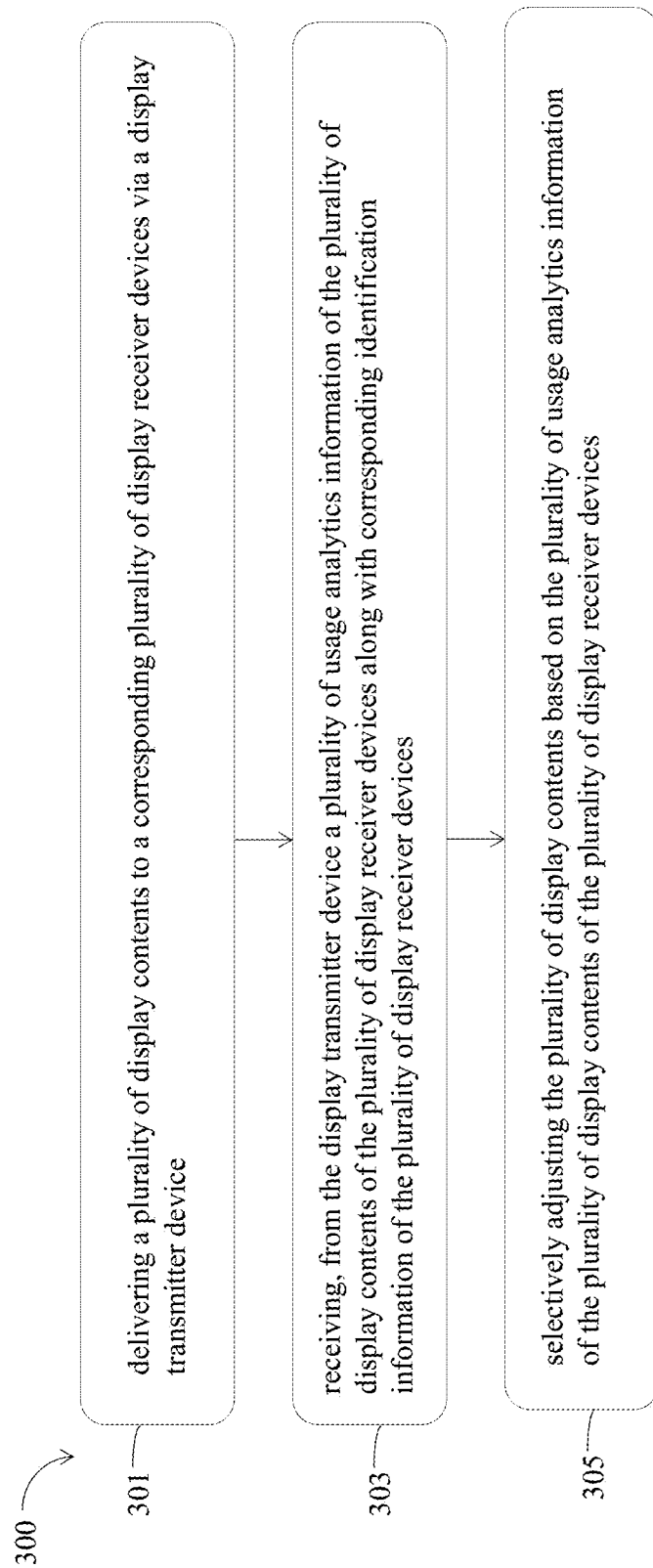
FIG. 3 illustrates an example process for a content server to adjust respective display contents based on corresponding usage analytics information from multiple display receiver devices in a display system, in accordance with various embodiments.

FIG. 3 illustrates an example process 300 for a content server to adjust respective ones of display contents based on corresponding ones of usage analytics information from multiple display receiver devices in a display system, in accordance with various embodiments. In embodiments, the process 300 may be a process performed by the content server 107 in FIG. 1, or the content server 207 in FIG. 2.

The process 300 may start at an interaction 301. During the interaction 301, a plurality of display contents may be delivered to a corresponding plurality of display receiver devices via a display transmitter device. For example, during the interaction 301, via the display transmitter device 101, the display content 175 and the display content 177 may be delivered to the display receiver device 103 and the display receiver device 105, respectively.

During an interaction 303, a plurality of usage analytics information of the plurality of display contents of the plurality of display receiver devices may be received, from a display transmitter device, along with corresponding identification information of the plurality of display receiver devices. For example, during the interaction 303, the usage analytics information 133 of the display content 131 of the display receiver device 103 may be received, from the display transmitter device 101, along with corresponding identification information 139 of the display receiver device 103. Similarly, the usage analytics information 153 of the display content 151 of the display receiver device 105 may be received, from the display transmitter device 101, along with corresponding identification information 159 of the display receiver device 105.

During an interaction 305, respective ones of the plurality of display contents may be selectively adjusted based on corresponding ones of the plurality of usage analytics information of the plurality of display contents of the plurality of display receiver devices. For example, during the interaction 305, the display content 175 may be selectively adjusted based on the usage analytics information 133 of the display content 131 of the display receiver device 103. Similarly, the display content 177 may be selectively adjusted based on the usage analytics information 153 of the display content 151 of the display receiver device 105.

Figure 4:
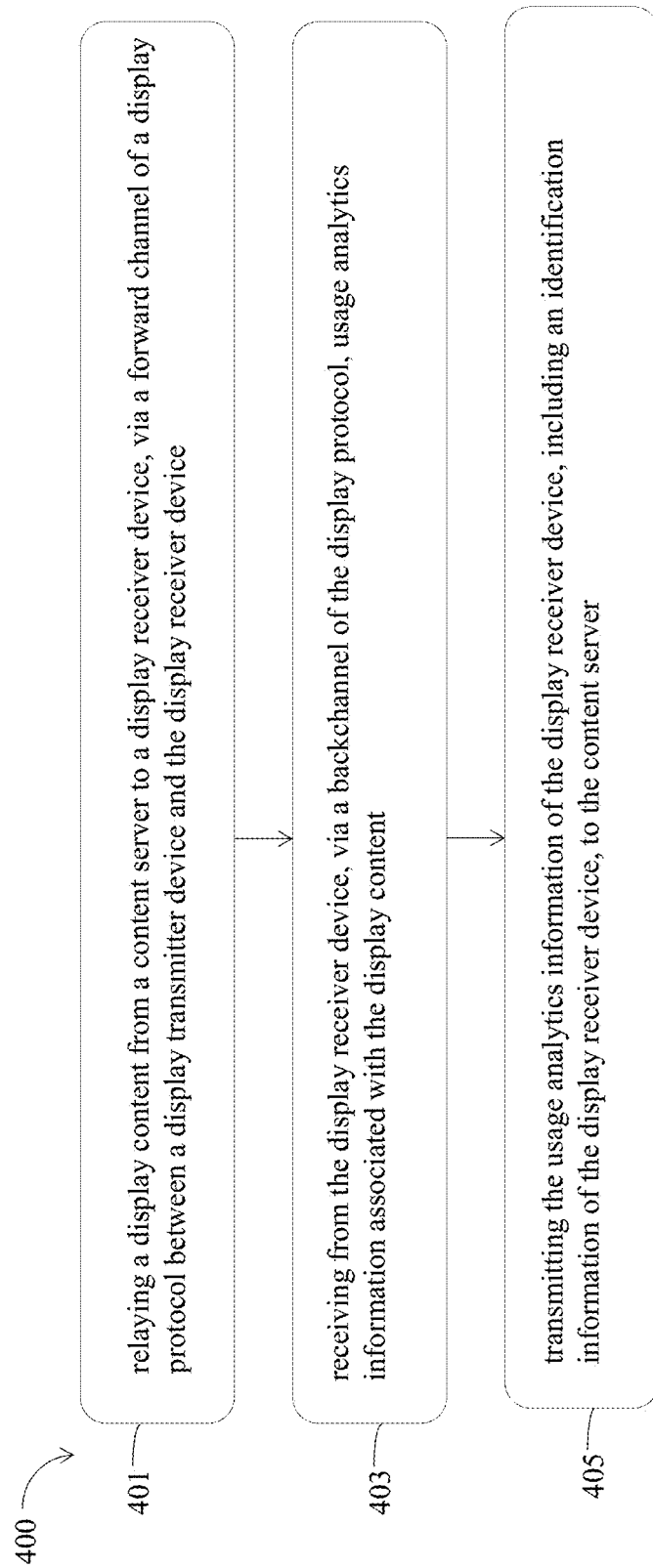
FIG. 4 illustrates an example process for a display transmitter device to relay display contents respectively adjusted based on corresponding usage analytics information from multiple display receiver devices in a display system, in accordance with various embodiments.

FIG. 4 illustrates an example process 400 for a display transmitter device to relay display contents respectively adjusted based on corresponding usage analytics information from multiple display receiver devices in a display system, in accordance with various embodiments. In embodiments, the process 400 may be a process performed by the display transmitter device 101 in FIG. 1, or the display transmitter device 201 in FIG. 2.

The process 400 may start at an interaction 401. During the interaction 401, a display content from a content server may be relayed to a display receiver device, via a forward channel of a display protocol between a display transmitter device and the display receiver device. For example, during the interaction 401, the display content 175 from the content server 107 may be relayed to the display receiver device 103, via the forward channel 102 of a display protocol between the display transmitter device 101 and the display receiver device 103.

During an interaction 403, a usage analytics information associated with the display content may be received from the display receiver device, via a backchannel of the display protocol. For example, during the interaction 403, the usage analytics information 133 associated with the display content 131 may be received from the display receiver device 103, via the backchannel 104.

During an interaction 405, the usage analytics information of the display receiver device, including an identification information of the display receiver device, may be transmitted to the content server. For example, during the interaction 405, the usage analytics information 133 of the display receiver device 103, including the identification information 139 of the display receiver device 103, may be transmitted to the content server 107.

Figure 5:
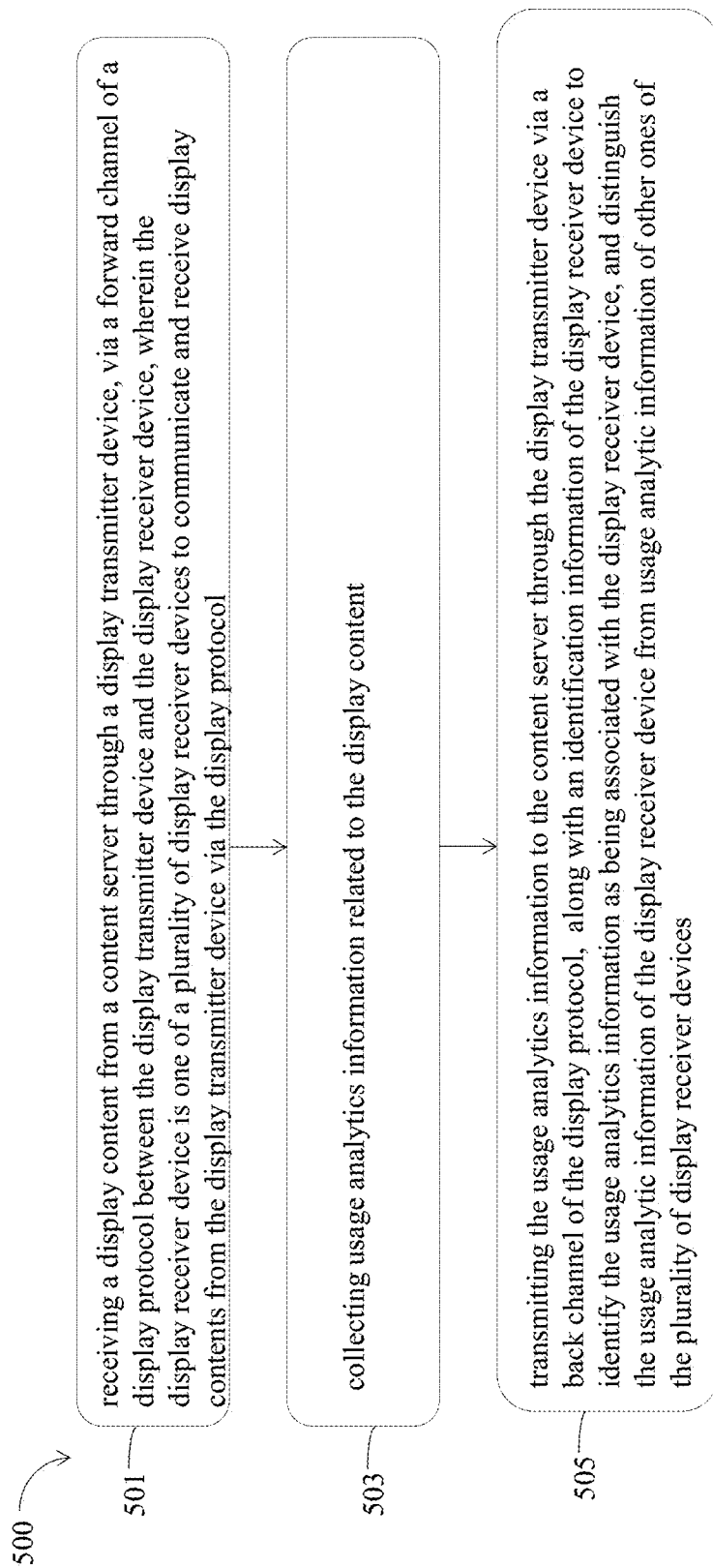
FIG. 5 illustrates an example process for a display receiver device to receive a display content respectively adjusted based on corresponding usage analytics information from the display receiver device in a display system with multiple display receiver devices, in accordance with various embodiments.

FIG. 5 illustrates an example process 500 for a display receiver device to receive a display content adjusted based on usage analytics information from the display receiver device in a display system with multiple display receiver devices, in accordance with various embodiments. In embodiments, the process 500 may be a process performed by the display receiver device 103 or the display receiver device 105 in FIG. 1, or the display receiver device 203 in FIG. 2.

The process 500 may start at an interaction 501. During the interaction 501, a display content may be received from a content server through a display transmitter device, via a forward channel of a display protocol between the display transmitter device and the display receiver device, wherein the display receiver device is one of a plurality of display receiver devices to communicate and receive display contents from the display transmitter device via the display protocol. For example, during the interaction 501, the display content 131 may be received from the content server 107 through the display transmitter device 101, via the forward channel 102, where the display receiver device 103 is one of a plurality of display receiver devices, e.g., the display receiver device 103 and the display receiver device 105, to communicate and receive display contents from the display transmitter device 101 via the display protocol.

During an interaction 503, usage analytics information related to the display content may be collected. For example, during the interaction 503, the usage analytics information 133 related to the display content 131 may be collected.

During an interaction 505, the usage analytics information may be transmitted to the content server through the display transmitter device via a back channel of the display protocol, along with an identification information of the display receiver device to identify the usage analytics information as being associated with the display receiver device, and distinguish the usage analytic information of the display receiver device from usage analytic information of other ones of the plurality of display receiver devices. For example, during the interaction 505, the usage analytics information 133 may be transmitted to the content server 107 through the display transmitter device 101 via the back channel 104, along with the identification information 139 of the display receiver device 103 to identify the usage analytics information 133 as being associated with the display receiver device 103, and distinguish the usage analytic information of the display receiver device from usage analytic information of other ones of the plurality of display receiver devices. [As described earlier, on receipt of the usage analytics information of the display receiver device, the content server may adjust the display content accordingly.]

Figure 6:
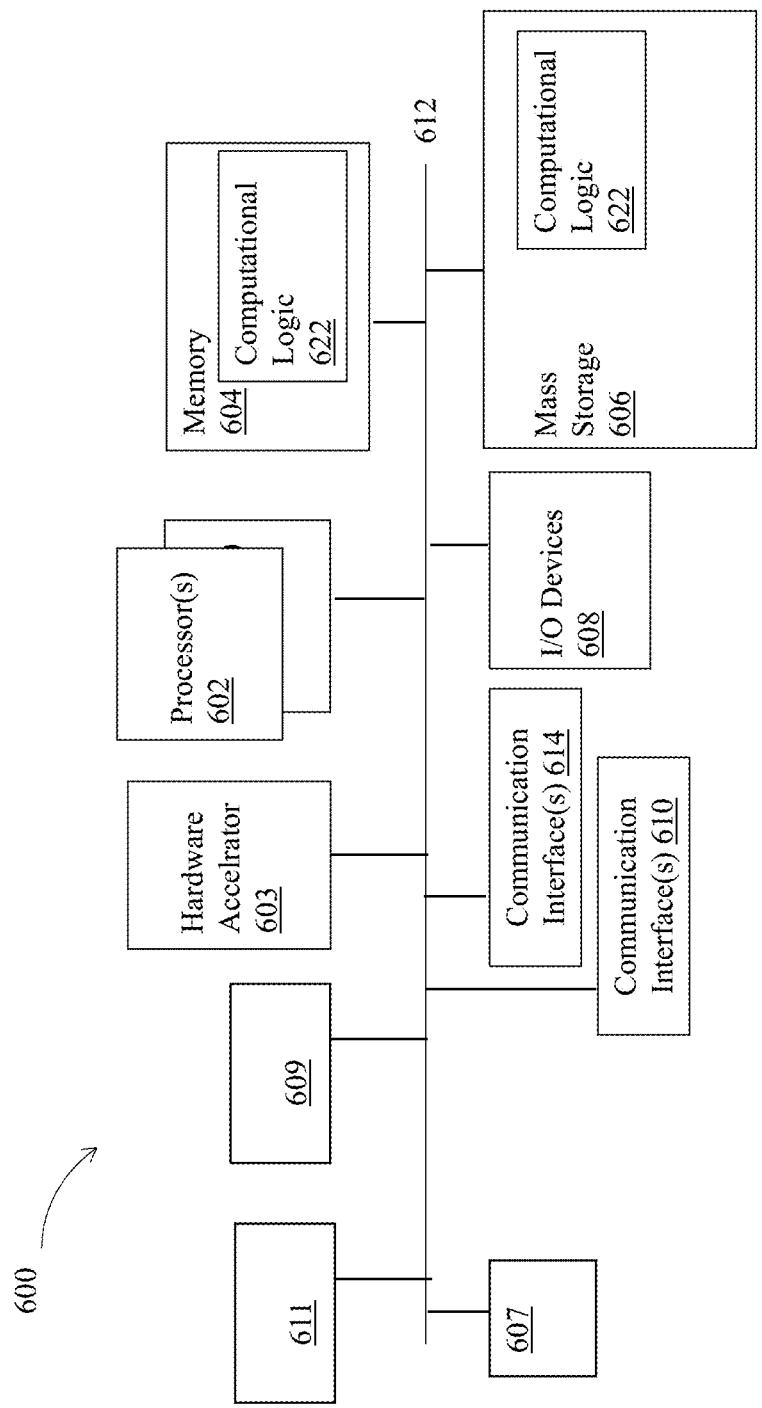
FIG. 6 illustrates an example device suitable for use to practice various aspects of the present disclosure, in accordance with various embodiments.

FIG. 6 illustrates an example device 600 that may be suitable as a device to practice selected aspects of the present disclosure. The device 600 may be an example of the display transmitter device 101, the display receiver device 103, the display receiver device 105, the content server 107, the display transmitter device 201, the display receiver device 203, and the content server 207, a communication device to implement the process 300, the process 400, or the process 500, as shown in FIG. 1, FIG. 2, FIG. 3, FIG. 4, or FIG. 5. As shown, the device 600 may include one or more processors 602, each having one or more processor cores, and optionally, a hardware accelerator 603 (which may be an ASIC or a FPGA). In alternate embodiments, the hardware accelerator 603 may be part of processor 602, or integrated together on a SOC. Additionally, the device 600 may include a memory 604, which may be any one of a number of known persistent storage medium, and mass storage 606. Furthermore, the device 600 may include communication interfaces 610 and 614. Communication interfaces 610 and 614 may be any one of a number of known communication interfaces. In addition, the 600 may include input/output devices 608. Furthermore, the device 600 may include a usage analytics engine 607, a presentation engine 609, a secure execution environment 611, which may be an example of the usage analytics engine 137, the usage analytics engine 157, the usage analytics engine 113, the usage analytics engine 237, the usage analytics engine 213, the presentation engine 173, the presentation engine 273, the secure execution environment 210, the secure execution environment 230, or the secure execution environment 270, as shown in FIG. 1 and FIG. 2. In embodiments, the usage analytics engine 607, the presentation engine 609 may be implemented in hardware, e.g., using ASIC. Similarly, the secure execution environment 611 may be implemented in hardware with its own processor execution environment, separate from processor(s) 602. In alternate embodiments, one or more (or aspects thereof) of the usage analytics engine 607, the presentation engine 609, and the secure execution environment 611 may be implemented with hardware accelerator 603 instead. In still other embodiments, one or more (or aspects thereof) of the usage analytics engine 607, the presentation engine 609, and the secure execution environment 611 may be implemented with as part of computational logic 622 instead. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 may be employed to store a working copy and a permanent copy of the programming instructions implementing the operations associated with software implementations of components associated with the earlier described respective adjusting of display contents based on corresponding usage analytics information from multiple display receiver devices of a display transmitter device, as described in connection with FIGS. 1-5, and/or other functions, collectively referred to as computational logic 622. The various elements may be implemented by assembler instructions supported by processor(s) 602 or high-level languages, such as, for example, C, that can be compiled into such instructions.

The various elements may be implemented by assembler instructions supported by processor(s) 602 or high-level languages, such as, for example, C, that can be compiled into such instructions. Operations associated with safety operations and configuration of safety operations not implemented in software may be implemented in hardware, e.g., via hardware accelerator 603.

The number, capability and/or capacity of these elements 601-622 may vary, depending on the number of other devices the device 600 is configured to support. Otherwise, the constitutions of elements 601-622 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 7:
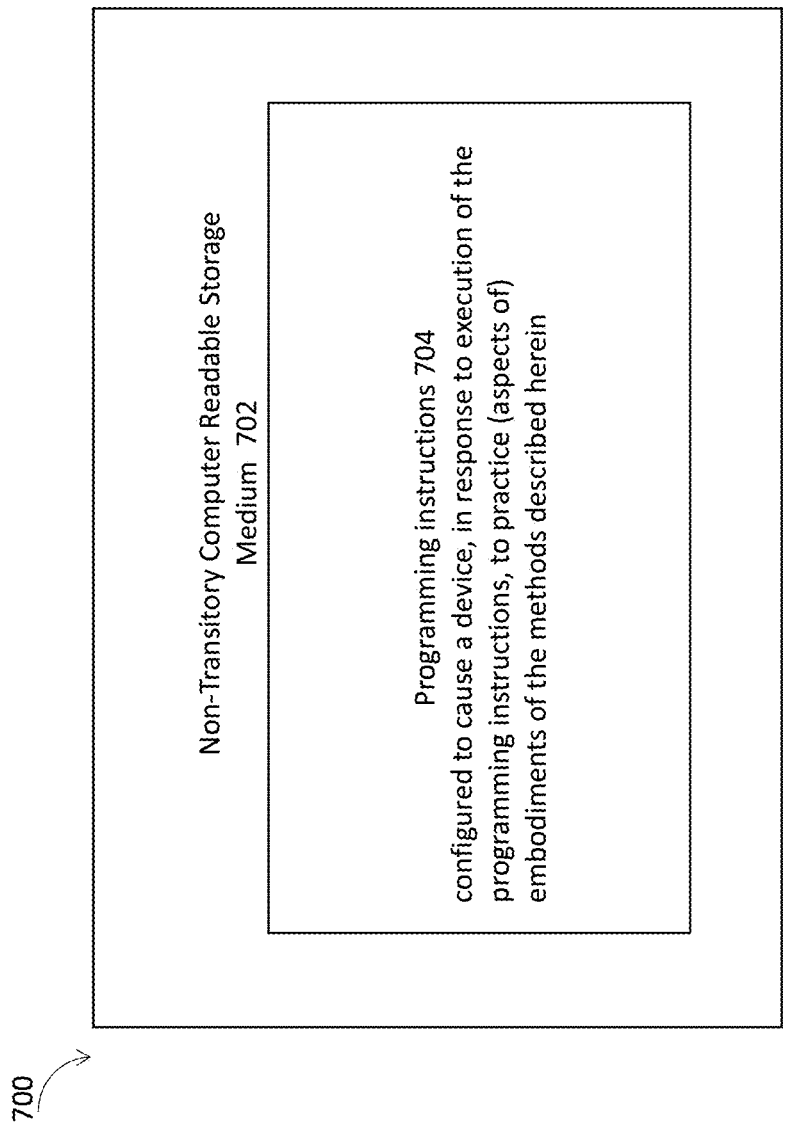
FIG. 7 illustrates a storage medium having instructions for practicing methods described with references to FIGS. 1-6, in accordance with various embodiments.

Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., device 600 employed as the display transmitter device 101, the display receiver device 103, the display receiver device 105, the content server 107, the display transmitter device 201, the display receiver device 203, and the content server 207, in response to execution of the programming instructions, to perform, e.g., various corresponding operations in a display transmitter device, a display receiver device, or a content server, associated with adjusting display contents based on usage analytics information from multiple display receiver devices, as shown in FIGS. 1-6.

In alternate embodiments, programming instructions 704 may be disposed on multiple computer-readable non-transitory storage media 702 instead. In alternate embodiments, programming instructions 704 may be disposed on computer-readable transitory storage media 702, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Figure 8:
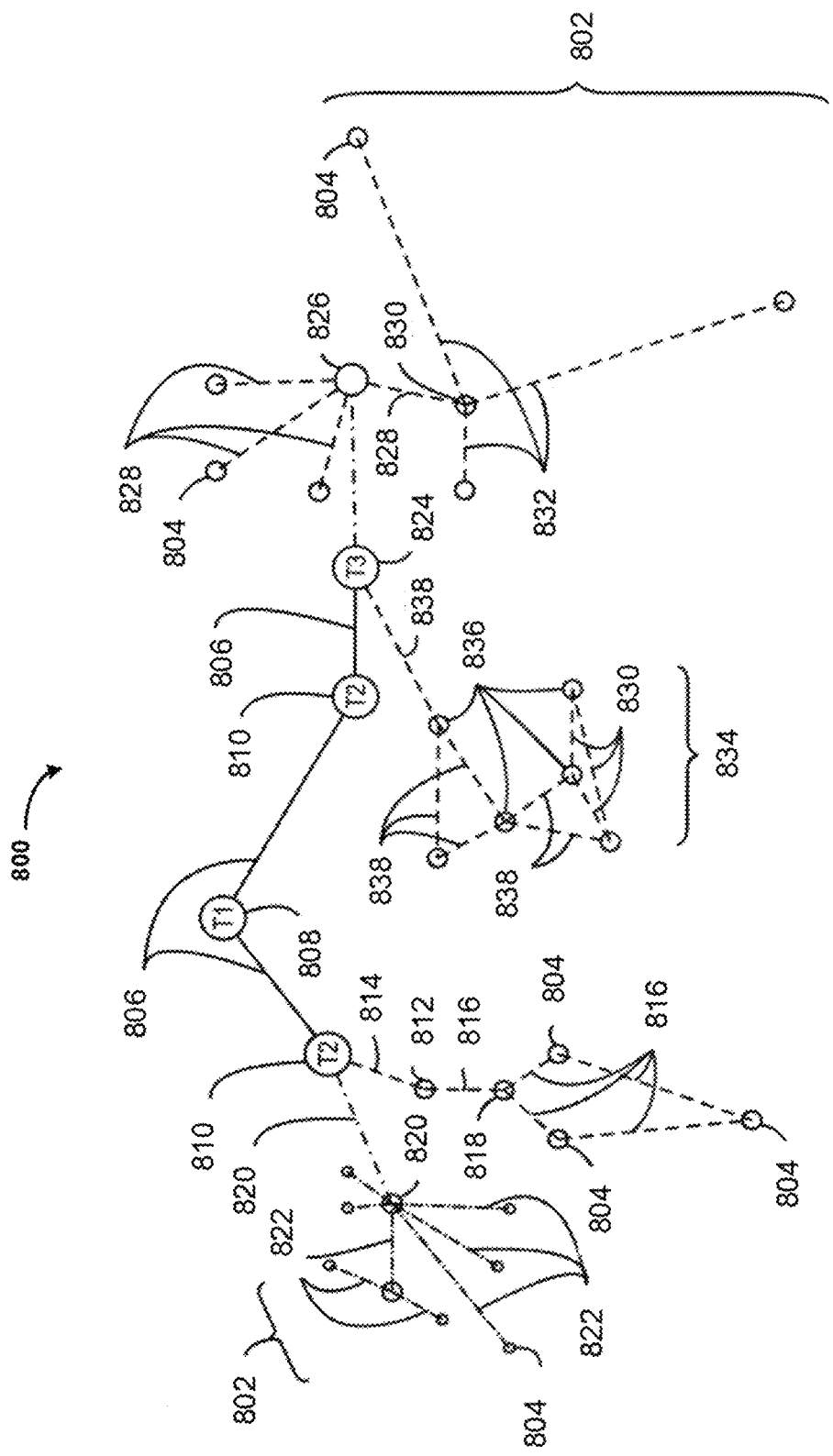
FIG. 8 illustrates an arrangement showing interconnections that may be present between a network and Internet of Things (IoT) networks, where an IoT network node may be a content server, in accordance with various embodiments.

FIG. 8 illustrates an arrangement showing interconnections that may be present between a network, e.g., the Internet 800, and Internet of Things (IoT) networks, where an IoT network node may be a content server, e.g., the content server 107 shown in FIG. 1, in accordance with various embodiments. The interconnections may couple smaller networks 802, down to the individual IoT device 804, to the fiber backbone 806 of the Internet 800. To simplify the drawing, not every device 804, or other object, is labeled.

The IoT is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1-7.

In FIG. 8, top-level providers, which may be termed tier 1 providers 808, are coupled by the fiber backbone of the Internet to other providers, such as secondary or tier 2 providers 810. In one example, a tier 2 provider 810 may couple to a tower 812 of an LTE cellular network, for example, by further fiber links, by microwave communications 814, or by other communications technologies. The tower 812 may couple to a mesh network including IoT devices 804 through an LTE communication link 816, for example, through a central node 818. The communications between the individual IoT devices 804 may also be based on LTE communication links 816. In another example, a high-speed uplink 820 may couple a tier 2 provider 810 to a gateway (GW) 820. A number of IoT devices 804 may communicate with the GW 820, and with each other through the GW 820, for example, over Bluetooth® low energy (BLE) links 822, where the BLE is a standard, as defined by the Bluetooth® Special Interest Group.

The fiber backbone 806 may couple lower levels of service providers to the Internet, such as tier 3 providers 824. A tier 3 provider 824 may be considered a general Internet service provider (ISP), for example, purchasing access to the fiber backbone 810 from a tier 2 provider 810 and providing access to a corporate GW 826 and other customers. From the corporate GW 826, a wireless local area network (WLAN) can be used to communicate with IoT devices 804 through Wi-Fi® links 828. A Wi-Fi link 828 may also be used to couple to a low power wide area (LPWA) GW 830, which can communicate with IoT devices 804 over LPWA links 832, for example, compatible with the LoRaWan specification promulgated by the LoRa alliance.

The tier 3 provider 824 may also provide access to a mesh network 834 through a coordinator device 836 that communicates with the tier 3 provider 824 using any number of communications links, such as an LTE cellular link, an LPWA link, or a link 838 based on the IEEE 802.15.4 standard, such as Zigbee®. Other coordinator devices 836 may provide a chain of links that forms cluster tree of linked devices.

IoT devices 804 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 804 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 804 may be biotic devices such as monitoring implants, biosensors, biochips, and the like. In other embodiments, an IoT device 804 may be a computer device that is embedded in a computer system and coupled with communications circuitry of the computer system. In such embodiments, the IoT device 804 may be a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 804 may include one or more memory devices and one or more processors to capture and store/record data. Each of the IoT devices 804 may include appropriate communications circuitry (e.g., transceiver(s), modem, antenna elements, etc.) to communicate (e.g., transmit and receive) captured and stored/recorded data. Further, each IoT device 804 may include other transceivers for communications using additional protocols and frequencies. According to various embodiments, the IoT devices 804 may be equipped with information (e.g., referred to as "modem profiles" herein) to configure configurable communications circuitry to perform communications in a corresponding communications. This may allow the IoT devices 804 to communicate using multiple wireless communications protocols without requiring an IoT device 804 to include separate hardware communications modules for each wireless communications protocol. The wireless communications protocols may be any suitable set of standardized rules or instructions implemented by the IoT devices 804 to communicate with other devices, including instructions for packetizing/depacketizing data, instructions for modulating/demodulating signals, instructions for implementation of protocols stacks, and the like. For example, IoT devices 804 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 812, GW 820, 826, and 830, coordinator device 836, and so forth, may also be incorporated with the embodiments described herein, in particular, with references to FIGS. 1-7.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 9:
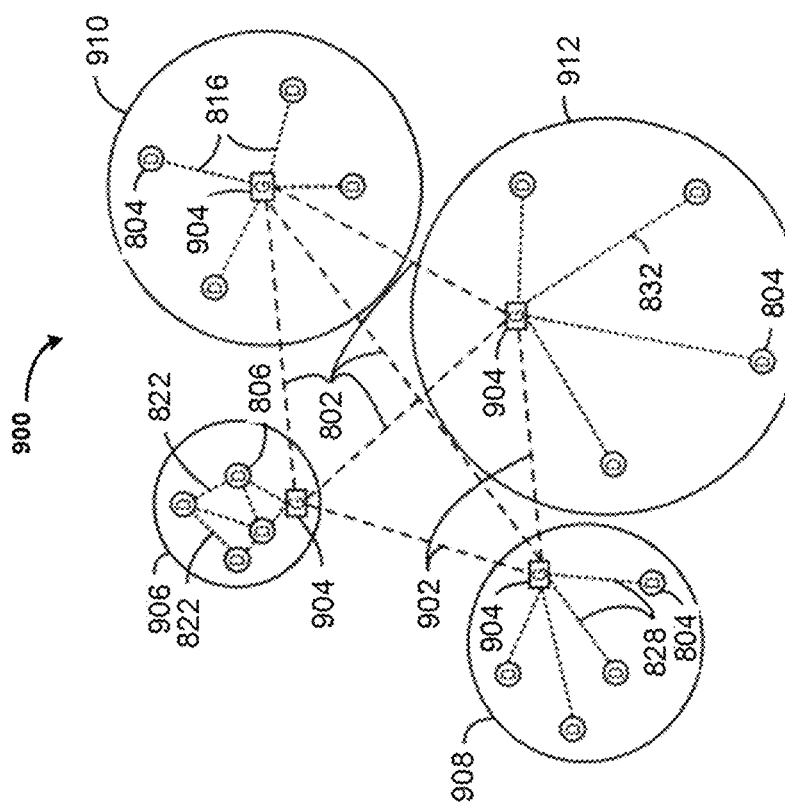
FIG. 9 illustrates an example domain topology for IoT networks, where an IoT network node may be a content server, in accordance with various embodiments.

FIG. 9 illustrates an example domain topology 900 for IoT networks coupled through backbone links 902 to GWs 904, where an IoT network node may be a content server, e.g., the content server 107 shown in FIG. 1, in accordance with various embodiments. Like numbered items are as described with respect to FIG. 8. Further, to simplify the drawing, not every device 804, or communications link 816, 822, 828, or 832 is labeled. The backbone links 902 may include any number of wired or wireless technologies, and may be part of a local area network (LAN), a wide area network (WAN), or the Internet. Similar to FIG. 8, in embodiments, one or more of IoT devices 804, GW 904, and so forth, may be incorporated with embodiments described herein.

The network topology 900 may include any number of types of IoT networks, such as a mesh network 906 using BLE links 822. Other IoT networks that may be present include a WLAN network 908, a cellular network 910, and an LPWA network 912. Each of these IoT networks may provide opportunities for new developments, as described herein. For example, communications between IoT devices 804, such as over the backbone links 902, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 906 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 908 may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 910 may be enhanced by systems that offload data, extend communications to more remote devices, or both. The LPWA network 912 may include systems that perform non-Internet protocol (IP) to IP interconnections, addressing, and routing.

Figure 10:
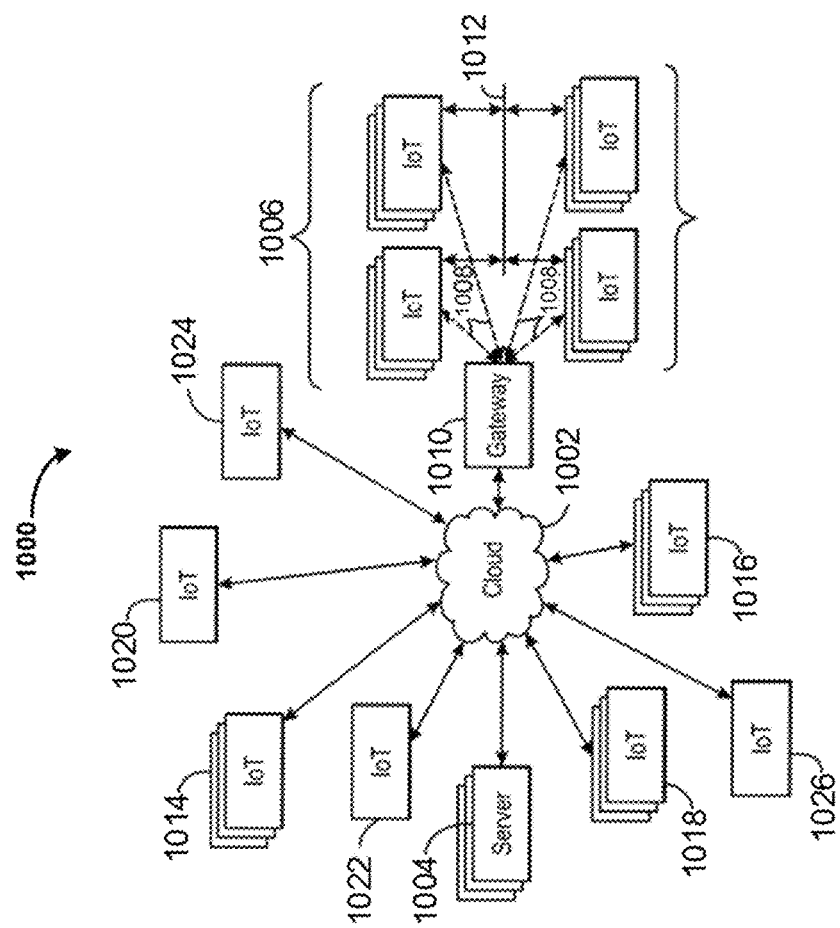
FIG. 10 illustrates an example arrangement of cloud computing network or cloud in communication with a number of IoT devices, where an edge node or an intermediate server of the cloud may be a content server, in accordance with various embodiments.

FIG. 10 illustrates an example arrangement 1000 of cloud computing network or cloud in communication with a number of IoT devices, where an edge node or an intermediate server of the cloud 1002 may be a content server, e.g., the content server 107 shown in FIG. 1, in accordance with various embodiments. The cloud 1002 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 1002 may be associated with network operator who owns or controls equipment and other elements necessary to provide network-related services, such as one or more base stations or access points, and one or more servers for routing digital data or telephone calls (for example, a core network or backbone network).

The IoT devices in FIG. 10 may be the same or similar to the IoT devices 804 discussed with regard to FIGS. 8-9. The IoT devices may include any number of different types of devices, grouped in various combinations, such as IoT group 1006 that may include IoT devices that provide one or more services for a particular user, customer, organizations, etc. A service provider may deploy the IoT devices in the IoT group 1006 to a particular area (e.g., a geolocation, building, etc.) in order to provide the one or more services. In one example, the IoT group 1006 may be a traffic control group where the IoT devices in the IoT group 1006 may include stoplights, traffic flow monitors, cameras, weather sensors, and the like, to provide traffic control and traffic analytics services for a particular municipality or other like entity. Similar to FIGS. 8-9, in embodiments, one or more of IoT devices 1014-1024, GW 1010, and so forth, may be incorporated with the various embodiments described herein, in particular, with references to FIGS. 1-7. For example, in some embodiments, the IoT group 1006, or any of the IoT groups discussed herein, may include the components, devices, systems discussed with regard to FIGS. 1-7.

The IoT group 1006, or other subgroups, may be in communication with the cloud 1002 through wireless links 1008, such as LPWA links, and the like. Further, a wired or wireless sub-network 1012 may allow the IoT devices to communicate with each other, such as through a local area network, a wireless local area network, and the like. The IoT devices may use another device, such as a GW 1010 to communicate with the cloud 1002. Other groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, or both.

As can be seen from FIG. 10, a large number of IoT devices may be communicating through the cloud 1002. This may allow different IoT devices to request or provide information to other devices autonomously. For example, the IoT group 1006 may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

In another example, the IoT group 1006 may be an industrial control group (also referred to as a "connected factory", an "industry 4.0" group, and the like) where the IoT devices in the IoT group 1006 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1006 may communicate with the servers 1004 via GW 1010 and cloud 1002 to provide captured data, which may be used to provide performance monitoring and analytics to the manufacturer or factory operator. Additionally, the IoT devices in the IoT group 1006 may communicate among each other, and/or with other IoT devices of other IoT groups, to make decisions on their own and to perform their tasks as autonomously as possible.

Clusters of IoT devices, such as the IoT groups depicted by FIG. 10, may be equipped to communicate with other IoT devices as well as with the cloud 1002. This may allow the IoT devices to form an ad-hoc network between the devices, allowing them to function as a single device, which may be termed a fog device. This is discussed further with respect to FIG. 11.

Figure 11:
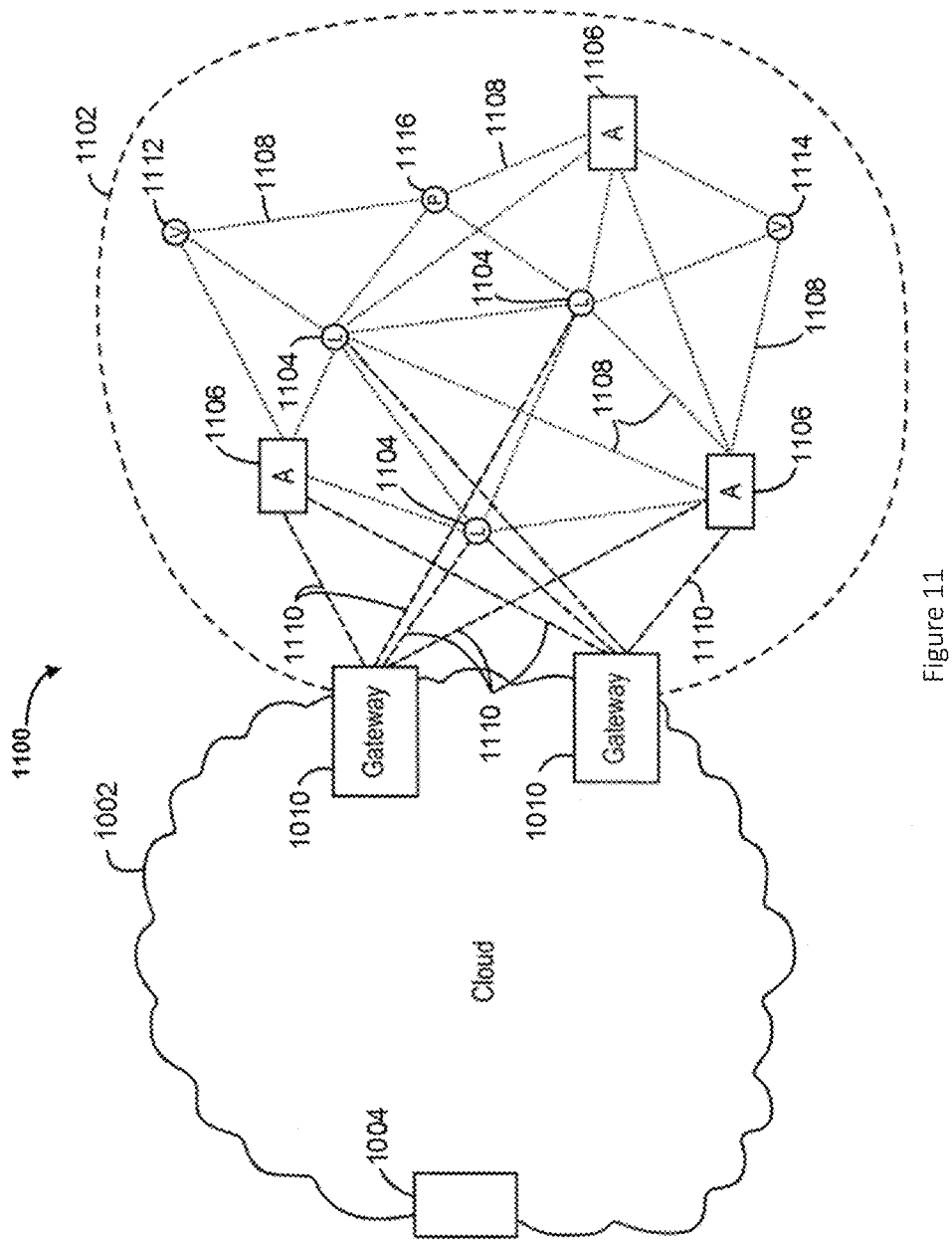
FIG. 11 illustrates an arrangement of a cloud computing network or cloud in communication with a mesh network of IoT devices or IoT fog, where an edge node or an intermediate server of the cloud may be a content server, in accordance with various embodiments.

FIG. 11 illustrates an arrangement 1100 of a cloud computing network or cloud in communication with a mesh network of IoT devices or IoT fog, which may be termed a fog device 1102, operating at the edge of the cloud 1002, where an edge node or an intermediate server of the cloud may be a content server, e.g., the content server 107 shown in FIG. 1, in accordance with various embodiments. Like numbered items are as described with respect to FIGS. 8-10. In this example, the fog device 1102 is a group of IoT devices at an intersection. The fog device 1102 may be established in accordance with specifications released by the OpenFog Consortium (OFC), the Open Connectivity Foundation™ (OCF), among others.

Data may be captured, stored/recorded, and communicated among the IoT devices 1104. Analysis of the traffic flow and control schemes may be implemented by aggregators 1106 that are in communication with the IoT devices 1104 and each other through a mesh network. Data may be uploaded to the cloud 1002, and commands received from the cloud 1002, through GWs 1010 that are in communication with the IoT devices 1104 and the aggregators 1106 through the mesh network. Similar to FIGS. 8-10, in embodiments, one or more of IoT devices 1104, aggregators 1106, and so forth, may be incorporated with the various embodiments described herein, in particular, with references to FIGS. 1-7. For example, in some embodiments, the fog device 1102, or any of grouping of devices discussed herein, may include the one or more components, devices systems, etc. discussed infra with regard to FIGS. 1-7.

Any number of communications links may be used in the fog device 1102. Shorter-range links 1108, for example, compatible with IEEE 802.15.4 may provide local communications between IoT devices that are proximate to one another or other devices. Longer-range links 1110, for example, compatible with LPWA standards, may provide communications between the IoT devices and the GWs 1010. To simplify the diagram, not every communications link 1108 or 1110 is labeled with a reference number.

The fog device 1102 may be considered to be a massively interconnected network wherein a number of IoT devices are in communications with each other, for example, by the communication links 1108 and 1110. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1010. In these networks, the number of interconnections may provide substantial redundancy, allowing communications to be maintained, even with the loss of a number of IoT devices.

Not all of the IoT devices may be permanent members of the fog device 1102. In the example in the drawing 1100, three transient IoT devices have joined the fog device 1102, a first mobile device 1112, a second mobile device 1114, and a third mobile device 1116. The fog device 1102 may be presented to clients in the cloud 1002, such as the server 1004, as a single device located at the edge of the cloud 1002. In this example, the control communications to specific resources in the fog device 1102 may occur without identifying any specific IoT device 1104 within the fog device 1102. Accordingly, if any IoT device 1104 fails, other IoT devices 1104 may be able to discover and control a resource. For example, the IoT devices 1104 may be wired so as to allow any one of the IoT devices 1104 to control measurements, inputs, outputs, etc., for the other IoT devices 1104. The aggregators 1106 may also provide redundancy in the control of the IoT devices 1104 and other functions of the fog device 1102.

In some examples, the IoT devices may be configured using an imperative programming style, e.g., with each IoT device having a specific function and communication partners. However, the IoT devices forming the fog device 1102 may be configured in a declarative programming style, allowing the IoT devices to reconfigure their operations and communications, such as to determine needed resources in response to conditions, queries, and device failures. This may be performed as transient IoT devices, such as the devices 1112, 1114, 1116, join the fog device 1102. As transient or mobile IoT devices enter or leave the fog 1102, the fog device 1102 may reconfigure itself to include those devices. This may be performed by forming a temporary group of the devices 1112 and 1114 and the third mobile device 1116 to control or otherwise communicate with the IoT devices 1104. If one or both of the devices 1112, 1114 are autonomous, the temporary group may provide instructions to the devices 1112, 1114. As the transient devices 1112, 1114, and 1116, leave the vicinity of the fog device 1102, it may reconfigure itself to eliminate those IoT devices from the network. The fog device 1102 may also divide itself into functional units, such as the IoT devices 1104 and other IoT devices proximate to a particular area or geographic feature, or other IoT devices that perform a particular function. This type of combination may enable the formation of larger IoT constructs using resources from the fog device 1102.

As illustrated by the fog device 1102, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Thus various example embodiments of the present disclosure have been described including, but are not limited to:

Example 1 may include a display transmitter device for provision of display content, comprising: a communication interface to receive from a display receiver device, via a backchannel of a display protocol between the display transmitter device and the display receiver device, usage analytics information associated with a display content relayed from a content server to the display receiver device, via a forward channel of the display protocol; and a usage analytics engine coupled to the communication interface to transmit the usage analytics information of the display receiver device, including an identification information of the display receiver device, to the content server.

Example 2 may include the display transmitter device of example 1 and/or some other examples herein, wherein the identification information of the display receiver device identifies the display receiver device from a plurality of other display receiver devices through corresponding forward channels of the display protocol with the respective plurality of other display receiver devices.

Example 3 may include the display transmitter device of any one of examples 1-2 and/or some other examples herein, further comprising: a storage coupled to the communication interface and the usage analytics engine to store the identification information of the display receiver device.

Example 4 may include the display transmitter device of any one of examples 1-2 and/or some other examples herein, wherein the communication interface is further to: receive an adjusted display content from the content server to be delivered to the display receiver device, wherein the adjusted display content is adjusted from the display content based on the usage analytics information; and transmit the adjusted display content to the display receiver device.

Example 5 may include the display transmitter device of any one of examples 1-2 and/or some other examples herein, further comprising: a secure execution environment, wherein the usage analytics engine is to operate within the secure execution environment, and the identification information of the display receiver device is valid within a time interval.

Example 6 may include the display transmitter device of example 5 and/or some other examples herein, wherein the display content is from the content server passing through the display transmitter device to the display receiver device without transcription by the display transmitter device.

Example 7 may include the display transmitter device of any one of examples 1-2 and/or some other examples herein, wherein the usage analytics information is a first usage analytics information, the display receiver device is a first display receiver device, and the communication interface is to receive from a second display receiver device a second usage analytics information associated with a second display content relayed from the content server to the second display receiver device; and the usage analytics engine is to transmit the second usage analytics information of the second display receiver device, including a second identification information of the second display receiver device, to the content server.

Example 8 may include the display transmitter device of example 7 and/or some other examples herein, wherein the usage analytics engine is further to aggregate the first usage analytics information and the second usage analytics information to be transmitted to the content server.

Example 9 may include a display receiver device for provision of display content, comprising: a communication interface to receive a display content from a content server through a display transmitter device, via a front channel of a display protocol between the display transmitter device and the display receiver device, wherein the display receiver device is one of a plurality of display receiver devices to communicate and receive display contents from the display transmitter device via the display protocol; a usage analytics engine coupled to the communication interface to collect usage analytics information related to the display content; wherein the communication interface is to transmit the usage analytics information to the content server through the display transmitter device via a back channel of the display protocol, along with an identification information of the display receiver device to identify the usage analytics information as being associated with the display receiver device, and distinguish the usage analytic information of the display receiver device from usage analytic information of other ones of the plurality of display receiver devices.

Example 10 may include the display receiver device of example 9 and/or some other examples herein, wherein the communication interface is further to receive an adjusted display content from the content server through the display transmitter device, wherein the adjusted display content is adjusted from the display content based on the usage analytics information.

Example 11 may include the display receiver device of any one of examples 9-10 and/or some other examples herein, wherein the display protocol is a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol.

Example 12 may include the display receiver device of any one of examples 9-10 and/or some other examples herein, wherein the display protocol is a Miracast protocol and the back channel is a user input back channel (UIBC) of the Miracast protocol, or the display protocol is a high-definition multimedia interface (HDMI) protocol, and the back channel is a consumer electronics control (CEC) channel for the HDMI protocol.

Example 13 may include the display receiver device of any one of examples 9-10 and/or some other examples herein, wherein the display receiver device is a selected one of a smart phone, a tablet, a wireless display, a smart television (TV), a touchscreen display, or a head-mounted display (HMD).

Example 14 may include the display receiver device of any one of examples 9-10 and/or some other examples herein, wherein the usage analytics information includes information about the display content related to a playback count, a real time streaming duration, a number of offline views, a content key rotation, a content metering, a location of the display content where a pause operation is performed, or a section of the display content that has been rewound, repeated, or zoomed in.

Example 15 may include the display receiver device of any one of examples 9-10 and/or some other examples herein, wherein the display receiver device is a head-mounted display (HMD) in a virtual reality (VR) system, and the usage analytics information comprises head tracking or eye tracking data associated with a part of the display content.

Example 16 may include the display receiver device of any one of examples 9-10 and/or some other examples herein, wherein the usage analytics information includes a user analytics for a user of the display receiver device, a device analytics for the display receiver device, or a content analytics related to the display content.

Example 17 may include the display receiver device of any one of examples 9-10 and/or some other examples herein, further comprising: a secure execution environment, wherein the usage analytics engine is to operate within the secure execution environment, and the identification information of the display receiver device is valid within a time interval.

Example 18 may include the display receiver device of example 17 and/or some other examples herein, wherein the usage analytics engine is to operate within the secure execution environment to authenticate the display receiver device before the communication interface is to receive the display content from the content server through the display transmitter device.

Example 19 may include the display receiver device of example 17 and/or some other examples herein, wherein the secure execution environment further includes a secure timer to control the time interval during which the identification information of the display receiver device is valid.

Example 20 may include the display receiver device of example 17 and/or some other examples herein, wherein the display content is a secure content subject to a digital right management (DRM) policy.

Example 21 may include a content server for provision of display content, comprising: a communication interface to deliver a plurality of display contents to a corresponding plurality of display receiver devices via a display transmitter device, and to receive, from the display transmitter device a plurality of usage analytics information of the plurality of display contents of the plurality of display receiver devices along with corresponding identification information of the plurality of display receiver devices; and a presentation engine coupled to the communication interface to selectively adjust the plurality of display contents based on the plurality of usage analytics information of the plurality of display contents of the plurality of display receiver devices.

Example 22 may include the content server of example 21 and/or some other examples herein, wherein the communication interface is further to deliver through the display transmitter device the selectively adjusted display contents to the plurality of display receiver devices along with the corresponding identification information of the plurality of display receiver devices.

Example 23 may include the content server of any one of examples 21-22 and/or some other examples herein, wherein the plurality of usage analytics information include usage analytics information aggregated by the display transmitter device based on usage analytics information of the plurality of display contents of the plurality of display receiver devices.

Example 24 may include the content server of any one of examples 21-22 and/or some other examples herein, wherein a usage analytics information of the plurality of usage analytics information includes information about a display content of the plurality of display contents related to a playback count, a real time streaming duration, a number of offline views, a content key rotation, a content metering, a location of the display content where a pause operation is performed, or a section of the display content that has been rewound, repeated, or zoomed in.

Example 25 may include the content server of any one of examples 21-22 and/or some other examples herein, further comprising: a secure execution environment, wherein the presentation engine is to operate within the secure execution environment, and the identification information of the plurality of display receiver devices are valid within a time interval.

Example 26 may include a method for provision of display content, comprising: receiving from a display receiver device, via a backchannel of a display protocol between a display transmitter device and the display receiver device, usage analytics information associated with a display content relayed from a content server to the display receiver device, via a forward channel of the display protocol; and transmitting the usage analytics information of the display receiver device, including an identification information of the display receiver device, to the content server.

Example 27 may include the method of example 26 and/or some other examples herein, wherein the identification information of the display receiver device identifies the display receiver device from a plurality of other display receiver devices through corresponding forward channels of the display protocol with the respective plurality of other display receiver devices.

Example 28 may include the method of any one of examples 26-27 and/or some other examples herein, further comprising: storing the identification information of the display receiver device.

Example 29 may include the method of any one of examples 26-27 and/or some other examples herein, further comprising: receiving an adjusted display content from the content server to be delivered to the display receiver device, wherein the adjusted display content is adjusted from the display content based on the usage analytics information; and transmitting the adjusted display content to the display receiver device.

Example 30 may include the method of any one of examples 26-27 and/or some other examples herein, wherein the receiving the usage analytics information and the transmitting the usage analytics information of the display receiver device are to be operated within a secure execution environment, and the identification information of the display receiver device is valid within a time interval.

Example 31 may include the method of example 30 and/or some other examples herein, wherein the display content is from the content server passing through the display transmitter device to the display receiver device without transcription by the display transmitter device.

Example 32 may include one or more computer-readable media having instructions for provision of display content, upon execution of the instructions by one or more processors, to perform the method of any one of examples 26-31.

Example 33 may include an apparatus for provision of display content, comprising: means for receiving from a display receiver device, via a backchannel of a display protocol between a display transmitter device and the display receiver device, usage analytics information associated with a display content relayed from a content server to the display receiver device, via a forward channel of the display protocol; and means for transmitting the usage analytics information of the display receiver device, including an identification information of the display receiver device, to the content server.

Example 34 may include the apparatus of example 33 and/or some other examples herein, wherein the identification information of the display receiver device identifies the display receiver device from a plurality of other display receiver devices through corresponding forward channels of the display protocol with the respective plurality of other display receiver devices.

Example 35 may include the apparatus of any one of examples 33-34 and/or some other examples herein, further comprising: means for storing the identification information of the display receiver device.

Example 36 may include the apparatus of any one of examples 33-34 and/or some other examples herein, further comprising: means for receiving an adjusted display content from the content server to be delivered to the display receiver device, wherein the adjusted display content is adjusted from the display content based on the usage analytics information; and means for transmitting the adjusted display content to the display receiver device.

Example 37 may include the apparatus of any one of examples 33-34 and/or some other examples herein, wherein the means for receiving the usage analytics information and the means for transmitting the usage analytics information of the display receiver device include a secure execution environment, and the identification information of the display receiver device is valid within a time interval.

Example 38 may include the apparatus of example 37 and/or some other examples herein, wherein the display content is from the content server passing through the display transmitter device to the display receiver device without transcription by the display transmitter device.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A display transmitter device (DTx) for provision of display content in a multi-display system comprising the DTx and a plurality of display receiver devices (DRxs), the DTx comprising:
 a communication interface to:
  relay respective display content obtained from a content server to respective DRxs of the plurality of DRxs via respective display protocol forward channels between the DTx and corresponding ones of the DRxs,
  receive from the respective DRxs, via respective display protocol backchannels between the DTx and corresponding ones of the respective DRxs, respective usage analytics information indicating usage parameters of the respective display content displayed by the respective DRxs, and respective identification information identifying the respective DRxs and respective users of the respective DRxs; and
 a usage analytics engine coupled to the communication interface to:
  generate collective usage information based on aggregation of the respective usage analytics information and the respective identification information, and
  transmit the collective usage analytics information to the content server.

2. The DTx of claim 1, wherein the identification information of the respective DRxs identifies a corresponding one of the respective DRxs through the corresponding display protocol forward channels.

3. The DTx of claim 1, further comprising:
 a storage coupled to the communication interface and the usage analytics engine to store the respective identification information.

4. The DTx of claim 1, wherein the communication interface is further to:
 receive adjusted display content from the content server to be delivered to at least one DRx of the plurality of DRxs, wherein the adjusted display content is adjusted from the respective display content displayed by at least one DRx based on the usage analytics information associated with the display content displayed by at least one DRx; and
 transmit the adjusted display content to the at least one DRx over a corresponding display protocol forward channel between the DTx and at least one DRx.

5. The DTx of claim 1, further comprising:
 a secure execution environment, wherein the usage analytics engine is to operate within the secure execution environment, and the identification information of the display receiver device is valid within a time interval.

6. The DTx of claim 5, wherein the respective display content from the content server is to pass through the DTx to the respective DRxs without transcription by the DTx.

7. The DTx of claim 1, wherein the respective usage analytics information includes one or more of a playback count of the respective display content, a streaming duration of the respective display content, a number of offline views, a content key rotation, content metering, where a pause operation is performed during display of the respective display content, where a rewind operation is performed during display of the respective display content, where a repeat or loop operation is performed during display of the respective display content, where a zoom operation is performed during display of the respective display content, and respective head-tracking data or respective eye tracking data associated with respective portions of the respective display content.

8. The DTx of claim 7, wherein the usage analytics engine is further to correlate the respective head-tracking data or the respective eye tracking data to the respective portions of the respective display content being served to the respective DRxs.

9. A display receiver device (DRx) among a plurality of DRxs in a multi-display system comprising a display transmitter device (DTx) and the plurality of DRxs, the DRx comprising:
 a communication interface to receive display content from a content server relayed through the DTx, via a display protocol front channel between the DTx and the DRx;
 a usage analytics engine coupled to the communication interface, the usage analytics engine to collect usage analytics information related to display and control of the display content served to the DRx, wherein the usage analytics information is different from other usage analytic information associated with other DRxs of the plurality of DRxs;
 wherein the communication interface is to transmit the usage analytics information along with identification information identifying the DRx and a user of the DRx to the DTx via a display protocol back channel for delivery to the content server in combination with the other usage analytic information.

10. The DRx of claim 9, wherein the communication interface is further to receive adjusted display content from the content server through the DTx, wherein the adjusted display content is adjusted from the display content based on the usage analytics information.

11. The DRx of claim 9, wherein the display protocol is a selected one of a mobile industry processor interface display serial interface (MIPI-DSI) protocol, a high-definition multimedia interface (HDMI) protocol, a display port (DP) protocol, a Miracast protocol, or a wireless display (WiDi) protocol.

12. The DRx of claim 9, wherein the display protocol is a Miracast protocol and the back channel is a user input back channel (UIBC) of the Miracast protocol, or the display protocol is a high-definition multimedia interface (HDMI) protocol, and the back channel is a consumer electronics control (CEC) channel for the HDMI protocol.

13. The DRx of claim 9, wherein the display receiver device is a selected one of a smart phone, a tablet, a wireless display, a smart television (TV), a touchscreen display, or a head-mounted display (HMD).

14. The DRx of claim 9, wherein the usage analytics information includes information about the display content related to a playback count, a real time streaming duration, a number of offline views, a content key rotation, a content metering, a location of the display content where a pause operation is performed, or a section of the display content that has been rewound, repeated, or zoomed in.

15. The DRx of claim 9, wherein the display receiver device is a head-mounted display (HMD) in a virtual reality (VR) system, and the usage analytics information comprises head tracking or eye tracking data associated with a part of the display content.

16. The DRx of claim 9, wherein the usage analytics information includes user analytics related to the user of the DRx, device analytics related to the DRx, and content analytics related to the display and control of the display content.

17. The DRx of claim 9, further comprising:
 a secure execution environment, wherein the usage analytics engine is to operate within the secure execution environment, and the identification information of the DRx is valid within a time interval.

18. The DRx of claim 17, wherein the usage analytics engine is to operate within the secure execution environment to authenticate the DRx before the communication interface is to receive the display content from the content server through the DTx.

19. The DRx of claim 17, wherein the secure execution environment further includes a secure timer to control the time interval during which the identification information of the DRx is valid.

20. The DRx of claim 17, wherein the display content is a secure content subject to a digital right management (DRM) policy.

21. One or more non-transitory computer-readable media (NTCRM) comprising instructions, wherein execution of the instructions by a display transmitter device (DTx) in a multi-display system comprising the DTx and a plurality of display receiver devices (DRxs) is to cause the DTx to:
 relay respective display content obtained from a content server to respective DRxs of the plurality of DRxs via respective display protocol forward channels between the DTx and corresponding ones of the DRxs;
 receive from the respective DRxs, via respective display protocol backchannels between the DTx and corresponding ones of the respective DRxs, respective usage analytics information indicating usage parameters of the respective display content displayed by the respective DRxs and respective identification information identifying the respective DRxs and respective users of the respective DRxs;
 generate collective usage information based on aggregation of the respective usage analytics information and the respective identification information; and
 send the collective usage analytics information to the content server.

22. The one or more NTCRM of claim 21, wherein execution of the instructions is to cause the DTx to:
 receive adjusted display content from the content server to be delivered to at least one DRx of the plurality of DRxs, wherein the adjusted display content is adjusted from the respective display content displayed by at least one DRx based on the usage analytics information associated with the display content displayed by at least one DRx; and
 transmit the adjusted display content to at least one DRx over a corresponding display protocol forward channel between the DTx and at least one DRx.

23. The one or more NTCRM of claim 21, wherein the respective usage analytics information includes one or more of a playback count of the respective display content, a streaming duration of the respective display content, a number of offline views, a content key rotation, content metering, where a pause operation is performed during display of the respective display content, where a rewind operation is performed during display of the respective display content, where a repeat or loop operation is performed during display of the respective display content, where a zoom operation is performed during display of the respective display content, and respective head-tracking data or respective eye tracking data associated with respective portions of the respective display content.

24. The one or more NTCRM of claim 23, wherein execution of the instructions is to cause the DTx to:
  correlate the respective head-tracking data or the respective eye tracking data to the respective portions of the respective display content being served to the respective DRxs.

25. The DTx of claim 1, wherein the DTx is a set-top box and individual DRxs of the plurality of DRxs are head-mounted display (HMD) devices of a virtual reality (VR) or Augmented Reality (AR) system.

* * * * *